W. M. WISE.
MEAT BLOCK SAW.
APPLICATION FILED JUNE 1, 1906.
905,265.
Patented Dec. 1, 1908.
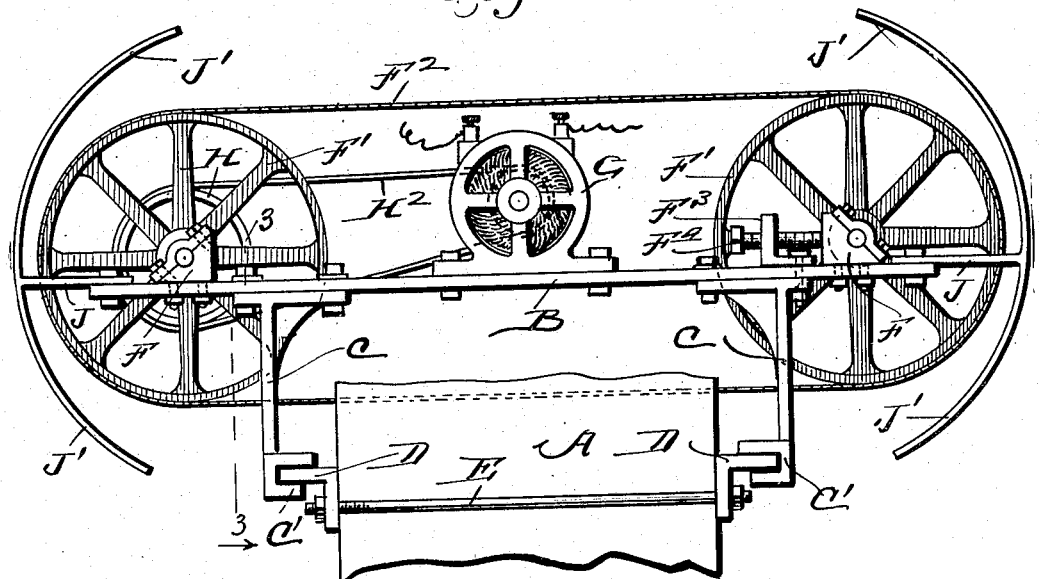
Fig. 1.
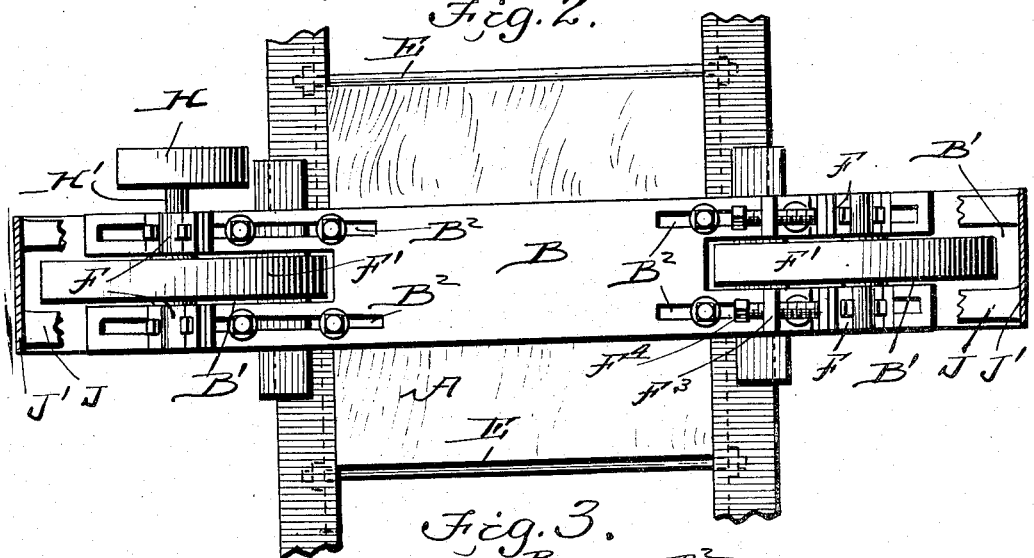
Fig. 2.
Fig. 3.
WITNESSES
INVENTOR
W. M. Wise.
ATTYS.

UNITED STATES PATENT OFFICE.

WILLARD MAYNARD WISE, OF STATLER RUN, WEST VIRGINIA.

MEAT-BLOCK SAW.

No. 905,265.     Specification of Letters Patent.     Patented Dec. 1, 1908.

Application filed June 1, 1906. Serial No. 319,757.

*To all whom it may concern:*

Be it known that I, WILLARD MAYNARD WISE, a citizen of the United States, and resident of Statler Run, in the county of Monongalia and State of West Virginia, have invented new and useful Improvements in Meat-Block Saws, of which the following is a specification.

This invention relates to a device for the purpose of sawing off the upper ends of meat blocks when they have become roughened or cut up.

The invention consists of a band saw, of a platform for supporting the saw and the motive power of the saw, and of detachable tracks adapted to be secured to the meat block, and means for securing the plate upon the tracks in order that the saw may be fed during the sawing operation.

The invention also consists of the novel features of construction hereinafter shown and described and pointed out in the claims and shown in the accompanying drawings in which:

Figure 1 is a side elevation of the device. Fig. 2 is a plan view, the motor, band saw and belts shown in Fig. 1 being removed. Fig. 3 is a section on the line 3—3 of Fig. 1, the wheel being removed.

In these drawings A represents the meat block to be operated upon and B a plate which is slotted at each end, as shown at B' for the purpose of receiving certain band saw wheels, and the plate B is also slotted upon each side of the slots B', as shown at B². Angled brackets C are adjustably connected to the plate B by means of bolts which pass through the slots B². At their lower ends the brackets C are provided with bifurcated shoes C' which engage and travel along angled tracks D. These tracks are slotted, as shown at D' and are held in place upon opposite sides of the block A by means of partially threaded rods E, which pass through the slots D', and are locked by suitable nuts. Bearings F are adjustably secured to the plate B by bolts which also pass through the slots B², and in these bearings are journaled wheels F' over which runs a band saw F². To adjust the tension of the band saw a bracket F³ is provided adjacent the bearings F at one end of the plate B and through each of these brackets work tension screws F⁴, which bear upon the bearings F, at that end of the plate. I have also shown a motor G arranged upon the plate B and a pulley H is mounted upon a shaft H' of one of the wheels F' and a belt H² runs from the apertured belt of the motor G to the pulley H. It will be obvious however that the motor G may be replaced by a gas or gasolene engine if desired. Suitable brackets J are bolted to the ends of the plate B and these brackets carry curved guard arms J', which extend partially around the wheels F' to prevent injury to the operator in the event of the breaking of the band saw.

The operation of the device will be obvious. The track D is clamped to the block to be operated on and the band saw driven by the motive power employed. Any suitable means may be employed to feed the saw to its work, the shoes C' of the supporting brackets C traveling along the tracks D as the saw is fed.

Having now described my invention, what I claim as new and desire to secure by Letters Patent is:

1. A device of the kind described, comprising a plate, angle iron tracks, said tracks being slotted, rods connecting said tracks and extending through the slots, nuts working on said rods, the tracks being adjustable along the rods, brackets adjustably connected to the plate and adapted to travel on the tracks, wheels adjustably journaled on the plate, and a band saw running over said wheels.

2. A device of the kind described, comprising adjustable tracks, means for securing said tracks to opposite sides of blocks of various diameters, brackets having shoes adapted to engage and travel on the tracks, a plate carried by said brackets, the brackets being adjustable with respect to the plate, a band saw carried by the plate, and means for driving said band saw.

WILLARD MAYNARD WISE.

Witnesses:
    J. F. TRIPPETT,
    C. R. STEVENSON.